United States Patent
Gruber et al.

(10) Patent No.: US 9,578,226 B2
(45) Date of Patent: Feb. 21, 2017

(54) PHOTOMETRIC REGISTRATION FROM ARBITRARY GEOMETRY FOR AUGMENTED REALITY

(75) Inventors: Lukas Gruber, Graz (AT); Thomas Richter-Trummer, Graz (AT); Dieter Schmalstieg, Graz (AT)

(73) Assignee: QUALCOMM Incorporated, San Diego, CA (US)

( * ) Notice: Subject to any disclaimer, the term of this patent is extended or adjusted under 35 U.S.C. 154(b) by 701 days.

(21) Appl. No.: 13/563,440

(22) Filed: Jul. 31, 2012

(65) Prior Publication Data

US 2013/0271625 A1     Oct. 17, 2013

Related U.S. Application Data (60) Provisional application No. 61/623,232, filed on Apr. 12, 2012.

(51) Int. Cl.
   *G06T 15/50*     (2011.01)
   *H04N 5/232*     (2006.01)
   (Continued)

(52) U.S. Cl.
   CPC ...... *H04N 5/23212* (2013.01); *G06K 9/00671* (2013.01); *G06K 9/4661* (2013.01);
   (Continued)

(58) Field of Classification Search
   CPC ........ G06T 15/506; G06T 15/50; G06T 15/80; G06T 15/60; G06T 15/06
   (Continued)

(56) References Cited

U.S. PATENT DOCUMENTS 6,628,298 B1 * 9/2003 Debevec ............... 345/632
7,750,926 B2   7/2010 Lonsing
   (Continued)

FOREIGN PATENT DOCUMENTS

GB    2441228 A    2/2008

OTHER PUBLICATIONS

Masayuki Kanbara, Geometric and Photometric Registration for Real-time Augmented Reality, 2002, IEEE, pp. 1-2.*
(Continued)

*Primary Examiner* — Abderrahim Merouan
(74) *Attorney, Agent, or Firm* — Silicon Valley Patent Group LLP (57) ABSTRACT

Photometric registration from an arbitrary geometry for augmented reality is performed using video frames of an environment captured by a camera. A surface reconstruction of the environment is generated. A pose is determined for the camera with respect to the environment, e.g., using model based tracking using the surface reconstruction. Illumination data for the environment is determined from a video frame. Estimated lighting conditions for the environment are generated based on the surface reconstruction and the illumination data. For example, the surface reconstruction may be used to compute the possible radiance transfer, which may be compressed, e.g., using spherical harmonic basis functions, and used in the lighting conditions estimation. A virtual object may then be rendered based on the lighting conditions. Differential rendering may be used with lighting solutions from the surface reconstruction of the environment and a second surface reconstruction of the environment combined with the virtual object.

31 Claims, 5 Drawing Sheets

(51) Int. Cl.
G06K 9/00 (2006.01)
G06K 9/46 (2006.01)
G06T 19/00 (2011.01)
H04N 5/262 (2006.01)
G06T 15/80 (2011.01)
G06T 15/06 (2011.01)
G06T 15/60 (2006.01)

(52) U.S. Cl.
CPC .......... *G06T 15/506* (2013.01); *G06T 19/006* (2013.01); *H04N 5/2621* (2013.01); *G06T 15/06* (2013.01); *G06T 15/50* (2013.01); *G06T 15/60* (2013.01); *G06T 15/80* (2013.01); *G06T 2215/16* (2013.01)

(58) Field of Classification Search
USPC 382/274, 240, 103, 100, 118, 190; 345/589, 345/633, 619, 426; 348/14.118, 14.08, 348/418
See application file for complete search history.

(56) References Cited

U.S. PATENT DOCUMENTS

| | | | |
|---|---|---|---|
| 8,139,059 B2* | 3/2012 | Trepte | 345/426 |
| 2003/0179197 A1* | 9/2003 | Sloan et al. | 345/426 |
| 2003/0179218 A1 | 9/2003 | Martins et al. | |
| 2004/0105573 A1* | 6/2004 | Neumann et al. | 382/103 |
| 2005/0104883 A1* | 5/2005 | Snyder et al. | 345/426 |
| 2005/0128211 A1* | 6/2005 | Berger et al. | 345/582 |
| 2005/0231740 A1* | 10/2005 | Uchino | H04N 1/6086 358/1.9 |
| 2006/0001918 A1* | 1/2006 | Okano et al. | 358/482 |
| 2008/0186390 A1* | 8/2008 | Sato et al. | 348/222.1 |
| 2010/0008574 A1* | 1/2010 | Ishiga | 382/167 |
| 2010/0283883 A1* | 11/2010 | Sato et al. | 348/335 |
| 2011/0043644 A1 | 2/2011 | Munger et al. | |
| 2012/0075484 A1* | 3/2012 | Kawamoto et al. | 348/207.1 |
| 2012/0086727 A1* | 4/2012 | Korah et al. | 345/633 |
| 2014/0002472 A1* | 1/2014 | Sobeski et al. | 345/582 |

OTHER PUBLICATIONS

Pessoa, et al. "Illumination Techniques for Photorealistic Rendering in Augmented Reality," Virtual Reality and Multimedia Research Group (GRVM)—Informatics Center (CIn)—Federal University of Pernambuco (UFPE), Science and Technology Center (CCT)—Catholic University of Pernambuco (UNICAP), 2008, 10 pages.
Aittala M., "Inverse lighting and photorealistic rendering for augmented reality", The Visual Computer, Jun. 2010, vol. 26 (6-8), pp. 669-678.
Alldrin, N.G., et al., "A Planar Light Probe," Proceedings of the 2006 IEEE Computer Society Conference on Computer Vision and Pattern Recognition (CVPR'06), IEEE, 2006, pp. 1-7.
Boivin S. et al., "Inverse Rendering from a Single Image", Conference on Colour in Graphics, Imaging, and Vision, CGIV 2002 Final Program and Proceedings, Society for Imaging Science and Technology, 2002, 8 pages.
Debevec P. E. et al., "Recovering High Dynamic Range Radiance Maps from Photographs", Proceeding SIGGRAPH '97, Proceedings of the 24th annual conference on Computer graphics and interactive techniques, ACM Press/Addison-Wesley Publishing Co, 1997, pp. 369-378.
Debevec P., et al., "Rendering Synthetic Objects into Real Scenes: Bridging Traditional and Image-Based Graphics with Global Illumination and High Dynamic Range Photography", Proceedings of the 25th annual conference on Computer graphics and interactive techniques, 1998, pp. 189-198.
Drettakis G. et al., "Interactive Common Illumination for Computer Augmented Reality", Proceedings of the Eurographics Workshop on Rendering Techniques '97, Springer-Verlag, 1997, pp. 45-56.

Fournier A., et al., "Common Illumination between Real and Computer Generated Scenes", Proceedings Graphics Interface, 1993, pp. 254-262.
Grosch T., et al., "Goniometric Light Reconstruction for Augmented Reality Image Synthesis", In Proceedings GI Jahrestagung, Frankfurt, Germany, 2003, 10 pages.
Gruber, L., et al., "The City of Sights: Design, Construction, and Measurement of an Augmented Reality Stage Set," IEEE International Symposium on Mixed and Augmented Reality 2010 Science and Technolgy Proceedings, IEEE, Oct. 13-16, 2010, pp. 157-163.
Hartmann, W., et al., "Shadow Catcher: A Vision Based Illumination Condition Sensor using ARToolkit," Augmented Reality Toolkit Workshop, IEEE, Oct. 7, 2003, pp. 44-45.
Hengel A. V. D., et al.,"SecondSkin: An Interactive Method for Appearance Transfer", Computer Graphics Forum, Pacific Graphics, vol. 28, Issue 7, 2009, pp. 1735-1744.
Jacobs K., et al.,"Classification of Illumination Methods for Mixed Reality", Computer Graphics forum, vol. 25, Issue 1, 2006, pp. 29-51.
Kanbara M., et al.,"Real-time Estimation of Light Source Environment for Photorealistic Augmented Reality", ICPR 2004, Proceedings of the 17th International Conference on Pattern Recognition, vol. 2, IEEE, 2004, pp. 911-914.
Klein, G., et al., "Compositing for Small Cameras," IEEE Proceedings of International Symposium on Mixed and Augmented Reality (ISMAR 2008, Cambridge), 2008, pp. 57-60.
Knecht, M., et al., "Differential Instant Radiosity for Mixed Reality," In Proceedings of the 2010 IEEE International Symposium on Mixed and Augmented Reality (ISMAR), IEEE, 2010, pp. 99-107.
Machida T., et al.,"Inverse Global Illumination Rendering for Dense Estimation of Surface Reflectance Properties", Lecture Notes in Computer Science, Springer Berlin Heidelberg, vol. 3540, 2005, pp. 790-801.
Mei, X., et al., "Sparse Representation of Cast Shadows via $\ell$ 1-Regularized Least Squares," 12th International Conference on Computer Vision (ICCV), IEEE, 2009, pp. 583-590.
Newcombe, R. A., et al., "KinectFusion: Real-Time Dense Surface Mapping and Tracking," Proceedings of the 10th IEEE International Symposium on Mixed and Augmented Reality (ISMAR '11), 2011, pp. 127-136.
Newcombe, R.A., et al., "Live Dense Reconstruction with a Single Moving Camera," IEEE Conference on Computer Vision and Pattern Recognition (CVPR), IEEE, 2010, pp. 1498-1505.
Newcombe, R.A.,et al., "DTAM: Dense Tracking and Mapping in Real-Time," IEEE International Conference on Computer Vission (ICCV), 2011, pp. 2320-2327.
Patow G., et al.,"A Survey of Inverse Rendering Problems", Computer Graphics Forum, vol. 22, Issue 4, Dec. 2003, pp. 663-687.
Pilet, J., et al., "An all-in-one solution to geometric and photometric calibration," International Symposium on Mixed and Augmented Reality (ISMAR), IEEE, Oct. 22-25, 2006, pp. 69-78.
Pilet, J., et al., "Retexturing in the Presence of Complex Illumination and Occlusions," 6th International Symposium on Mixed and Augmented Reality (ISMAR), IEEE, Nov. 13-16, 2007, pp. 1-8.
Ramamoorthi R., et al., "An Efficient Representation for Irradiance Environment Maps", Proceedings of the 28th annual conference on Computer graphics and interactive techniques, SIGGRAPH '01, 2001, pp. 497-500.
Ramamoorthi R., et al., "A Signal-Processing Framework for Inverse Rendering", In Proceedings of the 28th annual conference on Computer graphics and interactive techniques, 2001, pp. 117-128.
Samaras, D., et al., "Incorporating Illumination Constraints in Deformable Models for Shape from Shading and Light Direction Estimation," IEEE Transactions on Pattern Analysis and Machine Intelligence, IEEE, Feb. 2003, vol. 25 (2), pp. 247-264.
Sloan P.P., "Stupid Spherical Harmonics (SH) Tricks", pp. 42, Accessed online [Jul. 9, 2013] at www.ppsloan.org/publications/StupidSH36.pdf.

(56) References Cited

OTHER PUBLICATIONS

Wagner, D., et al., "Pose tracking from natural features on mobile phones", 7th IEEE/ACM International Symposium on Mixed and Augmented Reality (ISMAR), Sep. 15, 2008, pp. 125-134, IEEE, XP031343987.
Wang Y., et al.,"Estimation of multiple directional light sources for synthesis of augmented reality images", Graphical Models, Special Issue on Pacific Graphics, vol. 65, Issue 4, Jul. 2003, pp. 185-205.
Zach et al. "A Duality Based Approach for Realtime TV-L1 Optical Flow." Proceedings of the 29th DAGM conference on Pattern recognition, pp. 214-223 (2007).

* cited by examiner

PHOTOMETRIC REGISTRATION FROM ARBITRARY GEOMETRY FOR AUGMENTED REALITY

CROSS-REFERENCE TO PENDING PROVISIONAL APPLICATION

This application claims priority under 35 USC 119 to U.S. Provisional Application No. 61/623,232, filed Apr. 12, 2012 entitled "Photometric Registration From Arbitrary Geometry For Augmented Reality" which is assigned to the assignee hereof and which is incorporated herein by reference.

BACKGROUND

Visual coherent rendering in augmented reality seamlessly blends the virtual world and the real world together, in real-time. One challenge in augmented reality is the correct integration of real-world lighting. Integration of lighting involves three problems. First, the measurement of the real-world light parameters, also known as photometric registration, should be solved in real-time, as augmented reality systems operate in real-time. Second, the system should be able to measure the lighting from unknown environments without requiring a physical change to the environment, e.g., without requiring inserting special light probes into the environment. The third problem is generating a correct and perceptually convincing integration of the measured light parameters into a rendering solution by applying the real-world lighting conditions to the virtual content. Additionally, it is desirable that the rendering solution includes the application of light condition effects from the virtual content to the real-world environment. For example, virtual content may cast shadows in the real-world environment. Additionally, the virtual content may include virtual light sources, e.g., virtual torch light or specular reflective surfaces, that should also affect the real-world environment in a realistic manner. Thus, a photometric registration from an arbitrary geometry is desirable.

SUMMARY

Photometric registration from an arbitrary geometry for augmented reality is performed using video frames of an environment captured by a camera. A surface reconstruction of the environment is generated. A pose is determined for the camera with respect to the environment, e.g., using model based tracking using the surface reconstruction. Illumination data for the environment is determined from a video frame. Estimated lighting conditions for the environment are generated based on the surface reconstruction and the illumination data. For example, the surface reconstruction may be used to compute the possible radiance transfer, which may be compressed, e.g., using spherical harmonic basis functions, and used in the lighting conditions estimation. A virtual object may then be rendered based on the lighting conditions. Differential rendering may be used with lighting solutions from the surface reconstruction of the environment and a second surface reconstruction of the environment combined with the virtual object.

In one implementation, a method includes receiving a sequence of video frames of an environment at a mobile device; generating a surface reconstruction of the environment; determining a pose of the camera with respect to the environment; generating illumination data of the environment from at least one video frame; generating estimated lighting conditions of the environment in each video frame based on the surface reconstruction and the illumination data; and rendering a virtual object over the video frames based on the pose and the estimated lighting conditions.

In one implementation, an apparatus includes a camera; a display; and a processor coupled to receive a sequence of video frames of an environment captured by the camera, wherein the processor is configured to generate a surface reconstruction of the environment; determine a pose of the camera with respect to the environment; generate illumination data of the environment from at least one video frame; generate estimated lighting conditions of the environment in each video frame based on the surface reconstruction and the illumination data; and render a virtual object over the video frames based on the pose and the estimated lighting conditions.

In one implementation, an apparatus includes means for receiving a sequence of video frames of an environment; means for generating a surface reconstruction of the environment; means for determining a pose with respect to the environment; means for generating illumination data of the environment from at least one video frame; means for generating estimated lighting conditions of the environment in each video frame based on the surface reconstruction and the illumination data; and means for rendering a virtual object over the video frames based on the pose and the estimated lighting conditions.

In one implementation, a storage medium including program code stored thereon, includes program code to generate a surface reconstruction of an environment using at least one video frame of the environment captured with a camera; program code to determine a pose of the camera with respect to the environment; program code to generate illumination data of the environment from the at least one video frame; program code to generate estimated lighting conditions of the environment in each video frame based on the surface reconstruction and the illumination data; and program code to render a virtual object over the video frames based on the pose and the estimated lighting conditions.

DETAILED DESCRIPTION

Figure 1A:
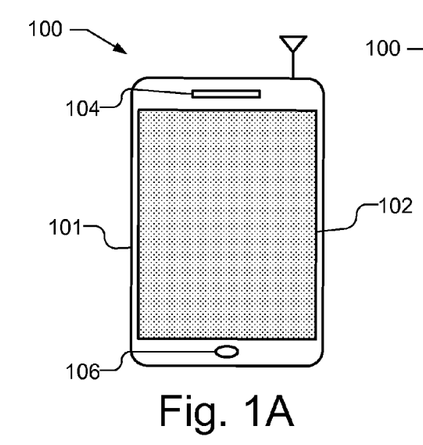
FIGS. 1A and 1B below illustrate a front side and back side, respectively, of a mobile device capable of photometric registration from arbitrary geometry for augmented reality.
Figure 1B:
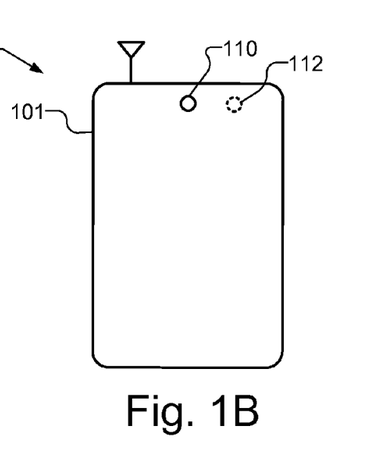

FIGS. 1A and 1B below illustrate a front side and back side, respectively, of a mobile device 100 capable of photometric registration from arbitrary geometry for augmented reality (AR) as discussed herein. The mobile device 100 is illustrated as including a housing 101, a display 102, which may be a touch screen display, as well as a speaker 104 and microphone 106. The mobile device 100 further includes a forward facing camera 110 to image the environment. The mobile device 100 may optionally include a forward facing depth camera 112 to provide depth data for the environment imaged by camera 110. Alternatively, the mobile device 100 may include a stereo camera or may use multiple images (frames of video) from camera 110 to produce depth data for the imaged environment.

As used herein, a mobile device refers to any portable electronic device such as a cellular or other wireless communication device, personal communication system (PCS) device, personal navigation device (PND), Personal Information Manager (PIM), Personal Digital Assistant (PDA), or other suitable mobile device. The mobile device may be capable of receiving wireless communication and/or navigation signals, such as navigation positioning signals. The term "mobile device" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile device" is intended to include all electronic devices, including wireless communication devices, computers, laptops, tablet computers, etc. capable of capturing images (or video) of its environment.

The mobile device 100 captures a sequence of video frames using camera 110, sometimes referred to herein simply as images, of an environment with an arbitrary, i.e., a-priori unknown, geometry and lighting conditions. The mobile device 100 is configured to estimate the real-world lighting conditions from the captured video frames at a per frame basis and to apply lighting conditions to AR objects rendered in the display 102. The mobile device 100 may also apply lighting effects from the AR objects on real world objects when the AR objects are rendered over the environment. The mobile device 100 is capable of estimating environmental lighting conditions from an arbitrary geometry in the environment. Thus, mobile device 100 does not require special light probes, such as reflective spheres, to be placed in the real-world environment in order to estimate the real-world lighting conditions. The mobile device 100 may use arbitrary geometry in combination with radiance transfer computations and spherical harmonics to improve the estimation of the environment lighting.

Figure 2:
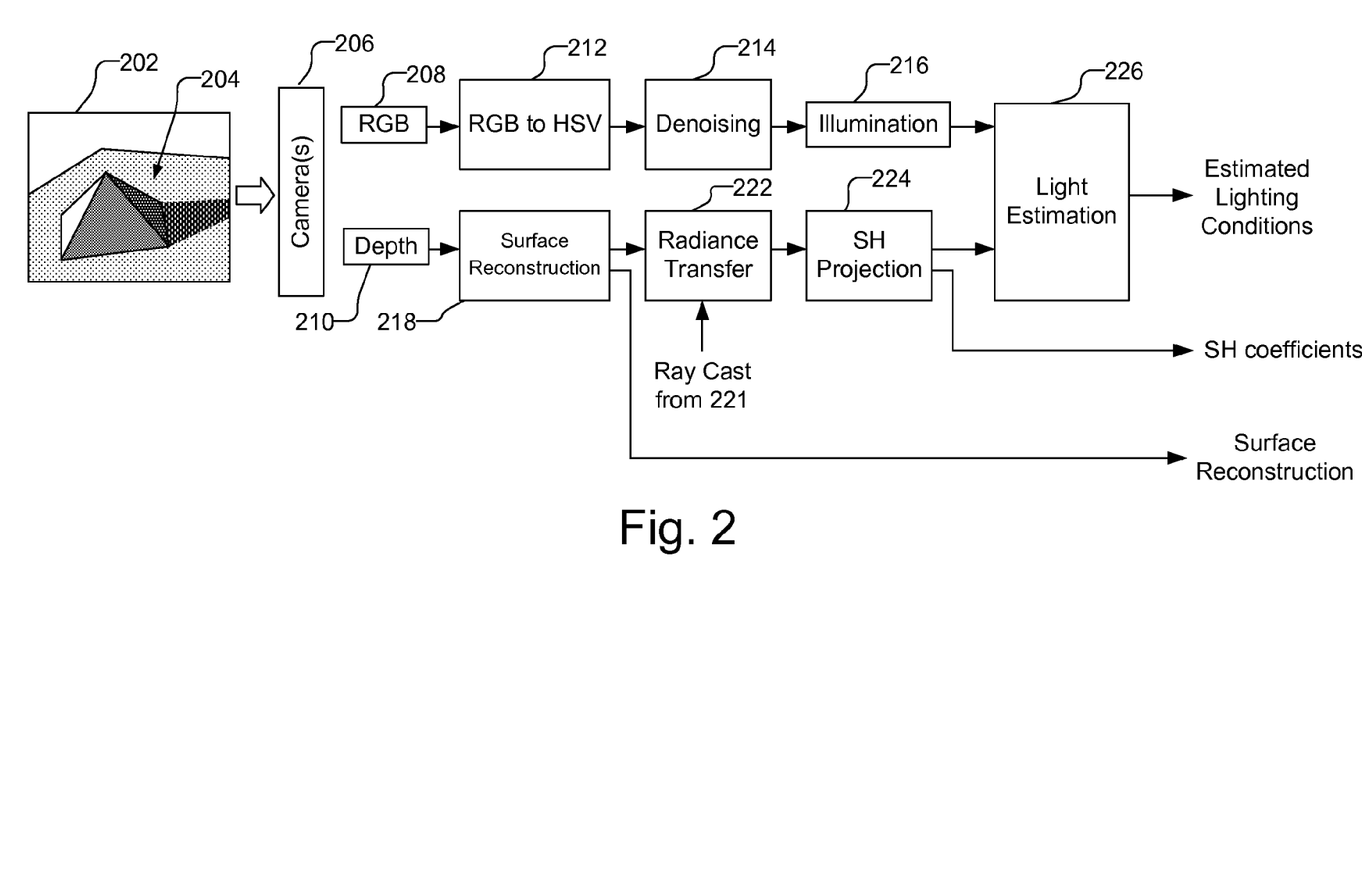
FIG. 2 illustrates a block diagram showing the process in which a mobile device estimates lighting conditions of the environment.

FIG. 2 illustrates a block diagram showing the process of estimating lighting conditions of the environment by mobile device 100. As illustrated, a sequence of video frames, illustrated by image 202, of an environment 204 is captured by one or more cameras (206), e.g., camera 110 or cameras 110 and 112. The image data obtained includes Red Green Blue (RGB) data 208 as well as depth data 210. As discussed above, the depth data may be captured in any desired manner, including the use of depth camera 112 or using stereo camera system or a monocular camera system in which frames from different positions are used to determine the depth data, which is known in the art.

The RGB data 208 is the color image of the environment. The color image (RGB data 208) is the image is shown in display 102 along with the final AR rendering 236, but is also used to measure the lighting on surfaces in the environment. Therefore, the RGB data 208 is converted into intensity components and color components, e.g., as HSV (Hue, Saturation, Value) or into the L*a*b* (CIE L*a*b*) color space (212).

Depending on the camera parameters and the quality of the image sensors, the image produced by a camera, i.e., RGB data 208, may be noisy. Noise in the image may influence the final result and, thus, the intensity components are denoised (214). For example, the intensity components may be smoothed using a bilateral filter, e.g., such as the TV-L1 bilateral filter, without losing the structure, thereby preserving edges and contours. The filtering is performed, e.g., on the illumination channel, V or L, respectively, and on the Hue channel, if clustering by colors is performed, and result is the illumination data (216).

A surface reconstruction of the environment is generated using the depth data (218). The surface reconstruction may be generated using any desired techniques, which are well known to those skilled in the art. An example of a known reconstruction technique is with use of a depth camera, depth data may be provided to a global model of the observed scene while obtaining the pose of the camera by tracking the live depth frame relative to the global model using a coarse-to-fine iterative closest point (ICP) process based on the acquired depth data, as described by R. A. Newcombe, S. Izadi, O. Hilliges, D. Molyneaux, D. Kim, A. J. Davison, P. Kohli, J. Shotton, S. Hodges, and A. Fitzgibbon, "KinectFusion: Real-time dense surface mapping and tracking," in Proceedings of the 2011 10th IEEE International Symposium on Mixed and Augmented Reality, Washington, D.C., USA, 2011, pp. 127-136, which is incorporated herein by reference. Dense reconstruction with a single moving camera produces an implicit surface representation, which may be stored in a voxel volume and updated every frame (volume integration). The present disclosure is not limited to any particular reconstruction technique and, thus, if desired, other well-known reconstructions techniques, including those that use depth cameras or stereo camera systems, may be used.

The surface reconstruction 218 is provided to compute the radiance transfer (222) and is also provided for use in FIG. 3 as discussed below. For every frame, the surface reconstruction is used to compute the local radiance transfer (222) for each surface point x using the surface reconstruction (218), as well as a ray cast from block 221 in FIG. 3. For each frame and each surface point x, the radiance transfer is then projected into spherical harmonics basis functions (SH) (224). The radiance transfer is the possible illumination at a certain surface point x, which is then projected into SH. If desired, other types of compression other than SH may be used with the radiance transfer (222), such as wavelets, such as Haar or Daubechies wavelets. By computing the local radiance transfer (222) for every frame, the use of pre-computed radiance transfer (PRT) methods, which are common in real-time graphics, is avoided, thereby permitting the system to process video frames of dynamically changing geometry in the environment. The radiance transfer (222) may be computed at image resolution. To increase performance, the radiance transfer may be determined for every $n^{th}$ pixel and may use bilinear interpolation between the computed pixels. The solutions of the radiance transfer (222) is the possible radiance transfer at a certain surface point x, which is then projected into SH basis functions (224) resulting in spherical harmonics constants. The SH projection (224) provides n SH coefficients, i.e., a set of SH coefficients for each surface point x that expresses the possible radiance transfer for x to light estimation 226 as well as light evaluation 235 shown in FIG. 3.

Using the output of SH projection (224) and the illumination data (216), the lighting conditions in the environment are estimated (226). Estimating light conditions is based on the reflection equation:

$$B(x, w_0) = \int_{\Omega_i} T(x)\rho(w_i, w_o)L(x, w_i)(w_i \cdot n)dw_i. \qquad \text{eq. 1}$$

The reflection $B(x, w_o)$ is an integrand of lighting L, bidirectional reflectance distribution function (BRDF) $\rho$, and texture T. The surface position is denoted with x and the outgoing direction is $w_o$. The normal vector is defined with $n_o$. The parameter T represents a simplified texture model with no explicit specular texture. In the following, the lighting term L is computed from concave and convex surfaces with a homogenous material, where the material reflection properties are assumed to be diffuse. The material color may be arbitrary and the light color is assumed to be white. In particular, this means that there is one unknown term, lighting L.

The SH projection (224) provides n SH coefficients, i.e., a set of SH coefficients for each surface point x that expresses the possible radiance transfer for x. Thus, once the reflections for the surface points are obtained, the diffuse environment lighting conditions may be estimated. Based on the n unknown SH coefficients $SH_{coeff}$ representing the environment map and $SH_x$ known surface points and diffuse light observations, the following linear problem may be solved:

$$SH_{coeff} = INV(SH_x) \cdot B_x. \qquad \text{eq. 2}$$

The parameter $SH_x$ is not naturally square and the inverse cannot be trivially computed. Moreover, the system is overdetermined and the results are not exact. Therefore, a least squares error minimizer may be applied to generate the estimate of the lighting conditions of the environment.

The ideal surface for estimating the environment illumination would be a sphere, which enables observations from all possible directions. Unfortunately, such a uniform distribution of normal directions is not always naturally given in the real world. In practice, the scene often consists of a large surface (e.g., a table) with a single dominant normal vector. Naturally, samples (single measurements of the illumination data) taken from the reconstructed surface will have a large impact on the final estimation. Other normal directions will not be sufficiently represented. For example, samples taken from smaller objects in the scene, which have a smaller pixel coverage in the video frame, will not yield a comparable number of samples. To improve the estimation of light conditions, the samples are weighted according to a uniform distribution. The weighting will have the following three effects. First, samples from overrepresented areas are normalized by the uniform distribution. Second, samples which are represented uniformly over a sphere are not changed. Third, the influence of samples which are not strongly represented will be diminished.

Figure 3:
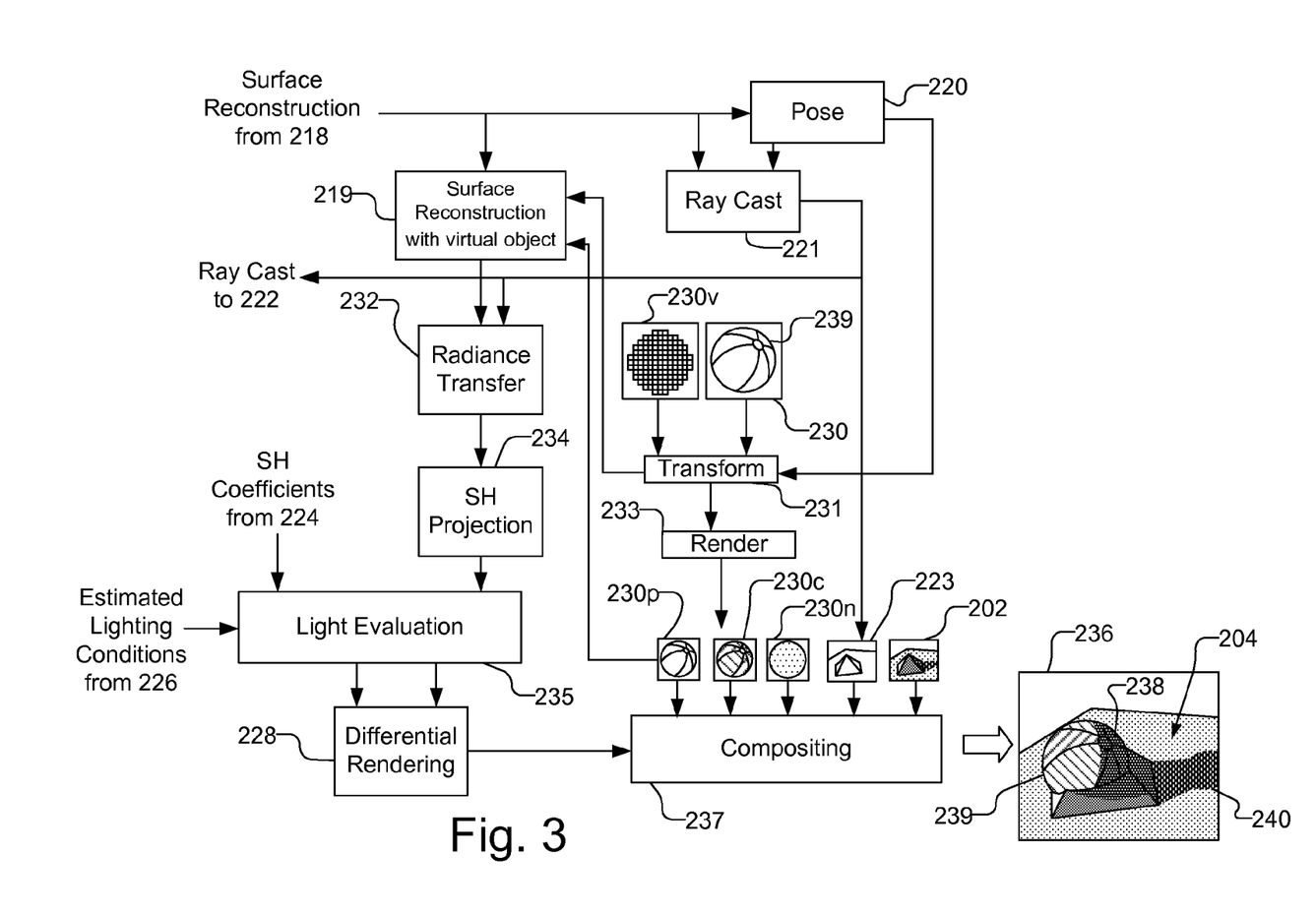
FIG. 3 illustrates the use of the estimated lighting conditions of the environment to perform photometric registration from an arbitrary geometry for augmented reality.

FIG. 3 illustrates the use of the estimated lighting conditions of the environment by mobile device 100 to perform photometric registration from an arbitrary geometry for AR. As illustrated, the surface reconstruction from 218, the SH coefficients from SH projection 224 and the estimated lighting conditions from light estimation 226 in FIG. 2 are provided and used to render the virtual object over the video frames. The augmented reality rendering pipeline is based on diffuse spherical harmonics lighting and supports global illumination techniques such as shadowing.

As illustrated, the surface reconstruction from 218 in FIG. 2 is used to obtain a pose estimation 220 and a ray cast 221 for the camera relative to the environment with six degrees of freedom (6 DOF) for each camera frame. The surface reconstruction from 218 serves as a three-dimensional (3D) reconstruction of the environment that is used to track the pose thereby eliminating the need for any prior knowledge of the environment such as a 2D planar tracking target, a previously created 3D tracking model or a fiducial marker. Pose estimation 220 using a 3D reconstruction is well known by those skilled in the art and the present disclosure is not limited to any particular technique to obtain the pose estimation. The pose estimation 220 is used in the generation of the ray cast (221), which is well known in the art. As illustrated, the ray cast 221 is provided to the radiance transfer 222 shown in FIG. 2.

The geometry of a virtual object 239 is represented in two different ways. In one way, the virtual geometry is conventionally loaded as a polygonal model (230) consisting of triangles. Additionally, a voxelized representation (230v) of the virtual model is computed beforehand and loaded into the system. The voxelized representation 230v of the virtual object supports the computation of light occlusions between virtual and real-world geometry, since the real-world model is also represented as a voxel volume. As illustrated, a second surface reconstruction 219 of the environment combined with the virtual object is generated based on the surface reconstruction from 218, the voxelized representation 230v after being transformed 231 based on the pose 220, and the position of the geometry 230p. The second surface reconstruction 219 and ray cast 221 are used to generate a second radiance transfer 232, which is compressed in the same manner as radiance transfer 222 discussed above, e.g., by projecting into spherical harmonic basis functions (SH projection 234).

The SH coefficients from SH projection 224 and the estimated lighting conditions from light estimation 226 in FIG. 2 are provided along with the SH coefficients from SH projection 234 for light evaluation 235. The SH coefficients from SH projection 224 in FIG. 2 are for the environment by itself and the SH coefficients from SH projection 234 are for the environment combined with the virtual object. The estimated light condition is an estimate of the real-world lighting conditions (light source) in the environment. The estimated lighting condition is applied to the radiance transfer for the environment (as provided by SH coefficients from SH projection 224 in FIG. 2), i.e., using the estimated light conditions and the geometry for each pixel, an intensity value is calculated, to produce the first lighting solution by light evaluation 235. Similarly, estimated lighting conditions are applied to the radiance transfer for the environment with the virtual object (as provided by SH coefficients from SH projection 234 in FIG. 2) to produce the second lighting solution by light evaluation 235. The first lighting solution for the environment and the second lighting solution for the environment with the virtual object are provided for differential rendering (228).

The virtual geometry 230 with the voxelized representation 230v is transformed (231) based on the pose estimation 220 and rendered (233) to produce the position of the geometry (230p), the color of the geometry (230c), and the normal vectors for geometry (230n) for the virtual object. This is done to support textured virtual objects and also to avoid aliasing artifacts from the volume ray casting. The position of the geometry (230*p*) is also used to generate the surface reconstruction with the virtual object (219).

Additionally, the real-world surface is computed from the surface reconstruction 218 by ray casting 221 into the voxel volume, which is provided as position 223. The occlusion between virtual object and real world are evaluated by comparing the z value of the virtual and real-world geometry. The camera image 202, along with the geometry 230*p*, color 230*c*, and normal 230*n* of the virtual object, the position 223 from the ray casting 221, and the output of differential rendering 228 are provided for compositing 237 to generate the rendered image 236. As illustrated in the rendered image 236, shadows 238 from the environment lighting conditions may be produced on the rendered virtual object, as well as shadows 240 from the virtual object 239 are produced in the real-world environment 204.

Thus, the estimation of the diffuse lighting environment in system 200 supports visual coherent rendering in augmented reality. Accordingly, virtual objects can be lit by real-world lighting and the virtual data is realistically integrated into the real-world data (camera image). The system 200 provides a real-time solution that enables the estimation of a dynamically changing diffuse lighting environment, where light changes in the real-world are applied to virtual objects. Moreover, real-world lights with different colors may be used. The use of spherical harmonics provides an efficient expression of the inverse lighting problem and diminishes the computational effort compared to conventional approaches.

Figure 4:
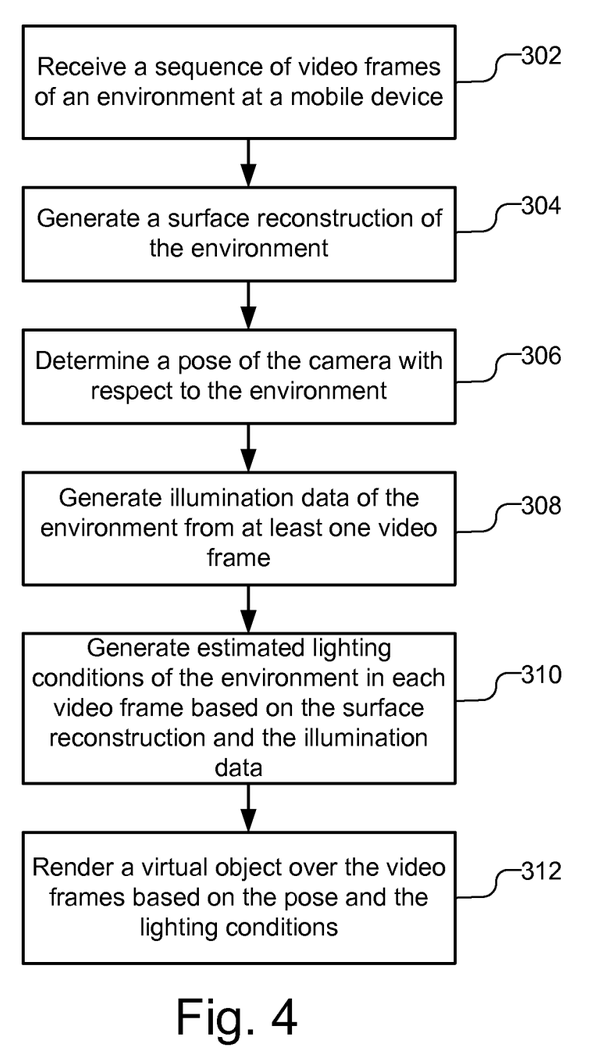
FIG. 4 is a flow chart of a method of photometric registration from arbitrary geometry for augmented reality.

FIG. 4 illustrates a flow chart of a method of photometric registration from arbitrary geometry for augmented reality. A sequence of video frames of an environment is received at a mobile device (302). If desired, a monocular camera system, stereo camera system or a camera with a depth sensor, i.e., an RGBD camera may be used. A surface reconstruction of the environment is generated (304), e.g., as illustrated by surface reconstruction 218 in FIG. 2 and FIG. 3. The surface reconstruction of the environment may be generated using, e.g., multiple video frames from a monocular camera system, images from a stereo camera, or using depth data from a camera with a depth sensor. A pose of the camera with respect to the environment is determined (306), e.g., as illustrated by pose 220 in FIG. 3. The pose of the camera with respect to the environment may be determined using well known vision based tracking techniques based on the surface reconstruction. The pose may also be determined, e.g., using an image and a known model of the real-world. If desired, additional data may be used to assist in determining the pose, such as inertial sensor data from, e.g., accelerometers, gyroscopes, magnetometers, etc. Illumination data of the environment is generated from at least one video frame (308), e.g., as illustrated by illumination 216 in FIG. 2. The illumination data may be generated by converting at least one video frame into intensity components and color components and using the intensity components to produce the illumination data. If desired, the intensity components may be denoised to generate the illumination data. The estimated lighting conditions in the environment are generated in each video frame based on the surface reconstruction and the illumination data (310), e.g., as illustrated by light estimation 226 in FIG. 2. The lighting conditions may be estimated by generating a radiance transfer for the environment based on the surface reconstruction and generating a compressed transfer function of the radiance transfer, e.g., by projecting the radiance transfer into spherical harmonics basis functions. The light conditions may then be estimated using the compressed transfer function of the radiance transfer and the illumination data to estimate the lighting conditions. A virtual object is rendered over the video frames based on pose and the lighting conditions (312), e.g., as illustrated in FIG. 3.

Figure 5:
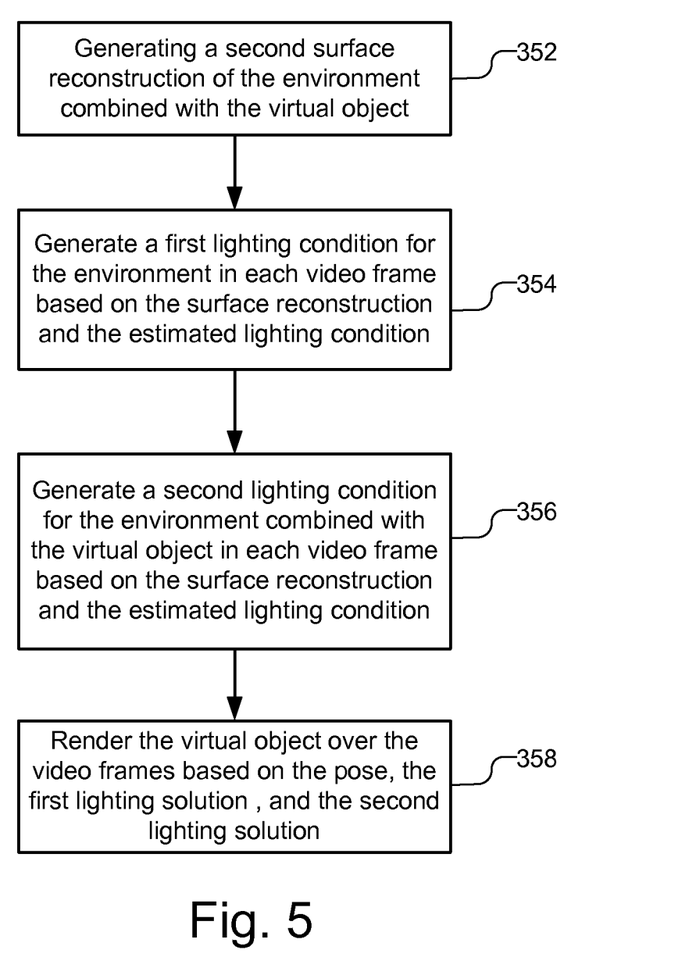
FIG. 5 illustrates a flow chart of a method of rendering a virtual object over the video frames based on pose and the lighting conditions.

FIG. 5 illustrates a flow chart of a method of rendering a virtual object over the video frames based on pose and the lighting conditions (312 from FIG. 4). As illustrated, a second surface reconstruction of the environment combined with the virtual object is generated (352), e.g., as illustrated by surface reconstruction 319 in FIG. 3. The second surface reconstruction may be generated by transforming a voxelized representation of the virtual object based on the pose and combining the voxelized representation of the virtual object after transforming with the surface reconstruction of the environment. A first lighting solution for the environment in each video frame is generated based on the estimated lighting conditions and the surface reconstruction of the environment (354), e.g., as illustrated by light evaluation 235 in FIG. 3. A second lighting solution for the environment combined with the virtual object in each video frame is generated based on the estimated lighting conditions and the second surface reconstruction of the environment combined with the virtual object (356), e.g., as illustrated by light evaluation 235 in FIG. 3.

Thus, the radiance transfer for the environment combined with the virtual object, which may be compressed using SH harmonics, is evaluated using the estimated lighting condition to produce the second lighting solution.

For example, the first lighting solution may be computed by generating a radiance transfer for the environment based on the surface reconstruction and generating a compressed transfer function of the radiance transfer, e.g., by projecting the second radiance transfer into a spherical harmonics basis function. The first lighting solution may then be computed using the compressed transfer function of the radiance transfer for the environment and the estimated lighting condition. Similarly, the second lighting solution may be computed by generating a second radiance transfer for the environment combined with the virtual object based on the second surface reconstruction and generating a compressed transfer function of the second radiance transfer, e.g., by projecting the second radiance transfer into a spherical harmonics basis function. The second lighting solution may then be computed using the compressed transfer function of the radiance transfer for the environment combined with virtual object and the estimated lighting condition.

The virtual object over the video frames is rendered based on the pose, the first lighting solution, and the second lighting solution (358), e.g., as illustrated by differential rendering 228 and compositing 237 in FIG. 3. For example, a differential rendering may be generated based on the first lighting solution and the second lighting solution. The differential rendering may be composited with compositing data derived from the transforming and rendering the virtual object, a ray cast, and the video frame to render the virtual object over the video frame.

Figure 6:
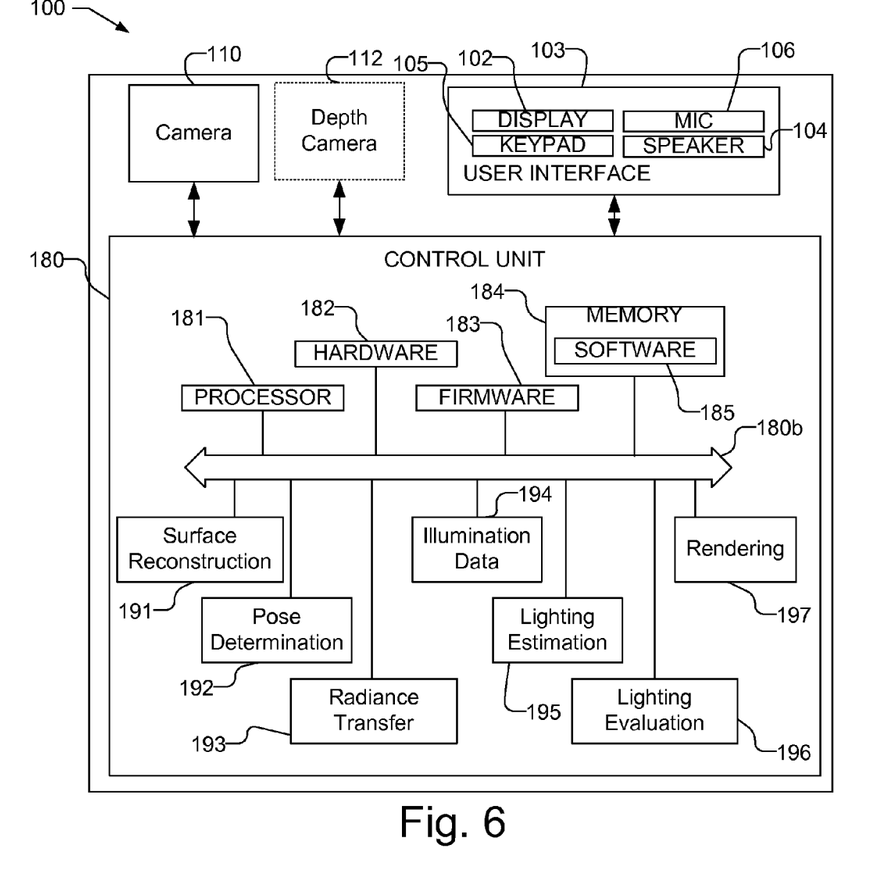
FIG. 6 is a block diagram of a mobile device capable of photometric registration from arbitrary geometry for augmented reality.

FIG. 6 is a block diagram of a mobile device 100 capable of photometric registration from arbitrary geometry for augmented reality as discussed above. The mobile device 100 includes a camera 110 and optionally a depth camera 112. The mobile device 100 may further includes a user interface 103 that includes a display 102, a keypad 105 or other input device through which the user can input information into the mobile device 100. If desired, the keypad 105 may be obviated by integrating a virtual keypad into the display 102 with a touch sensor. The user interface 103 may also include a microphone 106 and speaker 104, e.g., if the mobile device 100 is a mobile device such as a cellular telephone. Of course, mobile device 100 may include other elements unrelated to the present disclosure.

The mobile device 100 also includes a control unit 180 that is connected to and communicates with the camera 110, as well as depth camera 112 if included. The control unit 180 may be provided by a bus 180*b*, processor 181 and associated memory 184, hardware 182, software 185, and firmware 183. The control unit 180 may include a surface reconstruction unit 191, which may generate the surface reconstruction of the environment as well as the second surface reconstruction of the environment combined with the virtual object. A pose determination unit 192 determines the pose of the mobile device 100 with respect to the environment, e.g., using vision based tracking techniques and, if desired, the surface reconstruction. A radiance transfer unit 193 generates the radiance transfer, as well as compresses the radiance transfer for the environment and for the environment combined with the virtual object. An illumination data unit 194 generates illumination data based on the captured frames, e.g., including converting the images to intensity components and filtering the intensity components to optionally denoise the intensity components. A lighting estimation unit 195 determines the estimated lighting conditions based on the illumination data and the radiance transfer for the environment. Lighting evaluation unit computes the first lighting solution for the environment using the estimated lighting conditions and the radiance transfer for the environment, and computes the second lighting solution for the environment combined with the virtual object using the estimated lighting conditions and the radiance transfer for the environment combined with the virtual object. A rendering unit 197 may render the virtual object over the video frames based on the pose and lighting solutions, and may use differential rendering and compositing.

The various processing units, e.g., surface reconstruction unit 191, pose determination unit 192, radiance transfer unit 193, illumination data unit 194, lighting estimation unit 195, lighting evaluation unit 196, and rendering unit 197, are illustrated separately and separately from processor 181 for clarity, but all or some may be combined and/or part of the processor 181 or implemented in the processor based on instructions in the software 185 which is run in the processor 181. It will be understood as used herein that the processor 181, and/or the various processing units, can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 182, firmware 183, software 185, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 184 and executed by the processor 181. Memory may be implemented within or external to the processor 181. If implemented in firmware and/or software, the functions may be stored as one or more instructions or code on a storage medium that is computer-readable, wherein the storage medium does not include transitory propagating signals. Examples include storage media encoded with a data structure and storage encoded with a computer program. Storage media includes physical computer storage media. A storage medium may be any available medium that can be accessed by a computer. By way of example, and not limitation, such storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of storage media.

Thus, the apparatus may include means for receiving a sequence of video frames of an environment, which may be, e.g., camera 110 and camera 112 if desired. A means for generating a surface reconstruction for the environment, which may be surface reconstruction unit 191, or processor 181 performing instructions received from software 185. A means for determining a pose with respect to the environment may be, e.g., the pose determination unit 192 or processor 181 performing instructions received from software 185. A means for generating illumination data for the environment from at least one video frame may be, e.g., illumination data unit 194 or processor 181 performing instructions received from software 185. A means for estimating lighting conditions for the environment in each video frame based on the surface reconstruction and the illumination data may be, e.g., lighting estimation unit 195 or processor 181 performing instructions received from software 185. A means for rendering a virtual object over the video frames based on the pose and the lighting conditions may be rendering unit 197 or processor 181 performing instructions received from software 185.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:
1. A method comprising:
   receiving a sequence of video frames of an environment at a mobile device, the environment having a-priori unknown geometry and lighting conditions;
   generating a surface reconstruction of the environment;

determining a pose of the camera with respect to the environment;

generating illumination data of the environment from at least one video frame;

generating estimated lighting conditions of the environment in each video frame based on the surface reconstruction and the illumination data; and rendering a virtual object over the video frames based on the pose and the estimated lighting conditions.

2. The method of claim 1, wherein generating the estimated lighting conditions comprises:

generating a radiance transfer for the environment based on the surface reconstruction;

generating a compressed transfer function of the radiance transfer; and using the compressed transfer function of the radiance transfer and the illumination data to generate the estimated lighting conditions.

3. The method of claim 2, wherein generating the compressed transfer function comprises projecting the radiance transfer into a spherical harmonics basis functions.

4. The method of claim 1, wherein rendering the virtual object over the video frames based on the pose and the estimated lighting conditions comprises:

generating a first lighting solution using the estimated lighting conditions and the surface reconstruction of the environment; and rendering the virtual object over the video frames based on the pose and the first lighting solution.

5. The method of claim 4, wherein rendering the virtual object over the video frames based on the pose and the estimated lighting conditions further comprises:

generating a second surface reconstruction of the environment combined with the virtual object;

generating a second lighting solution using the estimated lighting conditions and the second surface reconstruction; and rendering the virtual object over the video frames based on the pose, the first lighting solution and the second lighting solution.

6. The method of claim 5, wherein generating the second surface reconstruction of the environment combined with the virtual object comprises:

transforming a voxelized representation of the virtual object based on the pose; and combining the voxelized representation of the virtual object after transforming with the surface reconstruction of the environment.

7. The method of claim 5, wherein generating the first lighting solution comprises:

generating a first radiance transfer for the environment based on the surface reconstruction;

generating a first compressed transfer function of the first radiance transfer; and using the first compressed transfer function and the estimated lighting conditions to calculate the first lighting solution;

wherein generating the second lighting solution comprises:

generating a second radiance transfer for the environment combined with the virtual object based on the second surface reconstruction;

generating a second compressed transfer function of the second radiance transfer; and using the second compressed transfer function and the estimated lighting conditions to calculate the second lighting solution;

wherein rendering the virtual object over the video frames comprises generating a differential rendering based on the first lighting solution and the second lighting solution.

8. The method of claim 1, wherein generating the illumination data comprises:

converting the at least one video frame into intensity components and color components; and denoising the intensity components to generate the illumination data.

9. The method of claim 1, wherein generating the surface reconstruction of the environment is performed using at least one of multiple video frames, images from a stereo camera, or a depth image from a depth camera.

10. The method of claim 1, wherein determining the pose of the camera with respect to the environment uses the surface reconstruction.

11. An apparatus comprising:

a camera;

a display; and a processor coupled to receive a sequence of video frames of an environment captured by the camera, the environment having a-priori unknown geometry and lighting conditions, wherein the processor is configured to generate a surface reconstruction of the environment; determine a pose of the camera with respect to the environment; generate illumination data of the environment from at least one video frame; generate estimated lighting conditions of the environment in each video frame based on the surface reconstruction and the illumination data; and render a virtual object over the video frames based on the pose and the estimated lighting conditions.

12. The apparatus of claim 11, wherein the processor is configured to generate the estimated lighting conditions by being configured to generate a radiance transfer for the environment based on the surface reconstruction; generate a compressed transfer function of the radiance transfer; and use the compressed transfer function of the radiance transfer and the illumination data to generate the estimated lighting conditions.

13. The apparatus of claim 12, wherein the processor is configured to generate the compressed transfer function by being configured to project the radiance transfer into a spherical harmonics basis function.

14. The apparatus of claim 11, wherein the processor is configured to render the virtual object over the video frames based on the pose and the estimated lighting conditions by being configured to generate a first lighting solution with the estimated lighting conditions and the surface reconstruction of the environment and render the virtual object over the video frames based on the pose and the first lighting solution.

15. The apparatus of claim 14, wherein the processor is configured to render the virtual object over the video frames based on the pose and the estimated lighting conditions by being further configured to generate a second surface reconstruction of the environment combined with the virtual object; estimate a second lighting solution with the estimated lighting conditions and the second surface reconstruction; and render the virtual object over the video frames based on the pose, the first lighting solution and the second lighting solution.

16. The apparatus of claim 15, wherein the processor is configured to generate the second surface reconstruction of the environment combined with the virtual object by being configured to transform a voxelized representation of the virtual object based on the pose; and combine the voxelized representation of the virtual object after transforming with the surface reconstruction of the environment.

17. The apparatus of claim 15, wherein the processor is configured to generate the first lighting solution by being to:
generate a first radiance transfer for the environment based on the surface reconstruction;
generate a first compressed transfer function of the first radiance transfer; and
use the first compressed transfer function and the estimated lighting conditions to calculate the first lighting solution; and
the processor is configured to generate the second lighting solution by being configured to:
generate a second radiance transfer for the environment combined with the virtual object based on the second surface reconstruction;
generate a second compressed transfer function of the second radiance transfer; and
use the second compressed transfer function and the estimated lighting conditions to calculate the second lighting solution;
wherein the processor is configured to render the virtual object over the video frames by being configured to generate a differential rendering based on the first lighting solution and the second lighting solution.

18. The apparatus of claim 11, wherein the processor is configured to generate the illumination data by being configured to convert the at least one video frame into intensity components and color components and to denoise the intensity components to generate the illumination data.

19. The apparatus of claim 11, wherein the processor is configured to generate the surface reconstruction of the environment using at least one of multiple video frames, images from a stereo camera, or a depth image from a depth camera.

20. The apparatus of claim 11, wherein the processor is configured to determine the pose of the camera with respect to the environment using the surface reconstruction.

21. An apparatus comprising:
means for receiving a sequence of video frames of an environment, the environment having a-priori unknown geometry and lighting conditions;
means for generating a surface reconstruction of the environment;
means for determining a pose with respect to the environment;
means for generating illumination data of the environment from at least one video frame;
means for generating estimated lighting conditions of the environment in each video frame based on the surface reconstruction and the illumination data; and
means for rendering a virtual object over the video frames based on the pose and the estimated lighting conditions.

22. The apparatus of claim 21, wherein the means for rendering the virtual object over the video frames based on the pose and the estimated lighting conditions generates a first lighting solution using the estimated lighting conditions and the surface reconstruction of the environment and renders the virtual object over the video frames based on the pose and the first lighting solution.

23. The apparatus of claim 22, wherein the means for rendering the virtual object over the video frames based on the pose and the estimated lighting conditions further generates a second surface reconstruction of the environment combined with the virtual object; generates a second lighting solution using the estimated lighting conditions and the second surface reconstruction; and renders the virtual object over the video frames based on the pose, the first lighting solution, and the second lighting solution.

24. The apparatus of claim 23, wherein the means for rendering the virtual object over the video frames based on the pose and the estimated lighting conditions generates the second surface reconstruction of the environment combined with the virtual object by transforming a voxelized representation of the virtual object based on the pose; and combining the voxelized representation of the virtual object after transforming with the surface reconstruction of the environment.

25. The apparatus of claim 23, wherein the means for rendering the virtual object over the video frames based on the pose and the estimated lighting conditions generates the first lighting solution by generating a first radiance transfer for the environment based on the surface reconstruction; generating a first compressed transfer function of the first radiance transfer; and using the first compressed transfer function and the estimated lighting conditions to calculate the first lighting solution; and the means for rendering the virtual object over the video frames based on the pose and the estimated lighting conditions estimates the second lighting solution by generating a second radiance transfer for the environment combined with the virtual object based on the second surface reconstruction; generating a second compressed transfer function of the second radiance transfer; and using the second compressed transfer function of the second radiance transfer and the estimated lighting conditions to generate the second lighting solution; and wherein the means for rendering the virtual object over the video frames generates a differential rendering based on the first lighting solution and the second lighting solution.

26. The apparatus of claim 21, wherein the means for generating the illumination data converts the at least one video frame into intensity components and color components and denoises the intensity components to generate the illumination data.

27. A storage medium including program code stored thereon, comprising:
program code to generate a surface reconstruction of an environment using at least one video frame of the environment captured with a camera, the environment having a-priori unknown geometry and lighting conditions;
program code to determine a pose of the camera with respect to the environment;
program code to generate illumination data of the environment from the at least one video frame;
program code to generate estimated lighting conditions of the environment in each video frame based on the surface reconstruction and the illumination data; and
program code to render a virtual object over the video frames based on the pose and the estimated lighting conditions.

28. The storage medium of claim 27, wherein the program code to render the virtual object over the video frames based on the pose and the estimated lighting conditions comprises:
program code to generate a first lighting solution using the estimated lighting conditions and the surface reconstruction; and
program code to render the virtual object over the video frames based on the pose and the first lighting solution.

29. The storage medium of claim 28, wherein the program code to render the virtual object over the video frames based on the pose and the estimated lighting conditions further comprises:

program code to generate a second surface reconstruction of the environment combined with the virtual object;

program code to generate a second lighting solution using the estimated lighting conditions and the second surface reconstruction; and program code to render the virtual object over the video frames based on the pose, the first lighting solution, and the second lighting solution.

30. The storage medium of claim 29, wherein the program code to generate the first lighting solution comprises:

program code to generate a first radiance transfer for the environment based on the surface reconstruction;

program code to generate a first compressed transfer function of the first radiance transfer; and program code to use the first compressed transfer function and the estimated lighting conditions to calculate the first lighting solution;

wherein the program code to generate the second lighting solution comprises program code to generate a second radiance transfer for the environment combined with the virtual object based on the second surface reconstruction;

program code to generate a second compressed transfer function of the second radiance transfer; and program code to use the second compressed transfer function and the estimated lighting conditions to calculate the second lighting solution;

wherein the program code to render the virtual object over the video frames comprises program code to generate a differential rendering based on the first lighting solution and the second lighting solution.

31. The storage medium of claim 27, wherein the program code to generate the illumination data comprises program code to convert the at least one video frame into intensity components and color components and program code to noise the intensity components to generate the illumination data.

* * * * *